United States Patent
Shrivastava et al.

(10) Patent No.: US 8,701,063 B1
(45) Date of Patent: Apr. 15, 2014

(54) COMPRESSING SCENARIOS OF ELECTRONIC CIRCUITS

(71) Applicant: Synopsys, Inc., Mountain View, CA (US)

(72) Inventors: Mayank Shrivastava, Sunnyvale, CA (US); Chaeryung Park, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/657,588

(22) Filed: Oct. 22, 2012

(51) Int. Cl.
*G06F 17/50* (2006.01)

(52) U.S. Cl.
USPC ............................................ 716/108

(58) Field of Classification Search
USPC ......... 716/100, 106–108, 110–111, 113, 132, 716/134
See application file for complete search history.

(56) References Cited

U.S. PATENT DOCUMENTS

| | | | |
|---|---|---|---|
| 2005/0172250 A1* | 8/2005 | Kucukcakar et al. | 716/6 |
| 2009/0210839 A1* | 8/2009 | Buck et al. | 716/6 |
| 2012/0159414 A1 | 6/2012 | Ghanta et al. | |

OTHER PUBLICATIONS

White, Mary Ann, "Maximizing Leakage Savings with DC 2010.03," Synopsys, Inc., Mar. 2010, 4 Pages.

* cited by examiner

*Primary Examiner* — Stacy Whitmore
(74) *Attorney, Agent, or Firm* — Fenwick & West LLP (57) ABSTRACT

The number of scenarios analyzed for an electronic circuit is reduced to improve the processing time and resource requirements of electronic design automation processes. Each scenario is associated with a mode and a corner for the electronic circuit. Groups of scenarios corresponding to different corners for the same mode are identified. A winner scenario from each group is identified, for example, by selecting the dominant scenario from the group that covers the most number of violations in the group. The winner scenario is adjusted to account for violations of other scenarios of the group. The adjustment corresponding to a violation for a timing node from another scenario is performed by reducing the required time of the timing node in the winner scenario by a margin. The margin is determined based on timing information from the other scenario scaled to account for differences between the two scenarios.

19 Claims, 7 Drawing Sheets

COMPRESSING SCENARIOS OF ELECTRONIC CIRCUITS

FIELD OF THE INVENTION

This invention relates generally to electronic design automation (EDA) of circuits and in particular to compressing scenarios of electronic circuits.

BACKGROUND

Due to the large number of components in state of the art electronic circuits, most of their design and production is computer implemented. Various operations are performed during design of the electronic circuit, for example, timing analysis for validating timing performance of an electronic design or different types of optimizations based on the electronic circuit. Performing these operations for large electronic circuits can take significant time. Furthermore, the analysis performed for these operations needs to be repeated multiple times for the same electronic design for various combinations of modes and corners. Semiconductor device parameters can vary with conditions such as fabrication process, operating temperature, and power supply voltage. A circuit fabricated using these processes may run slower or faster than specified due to variations in operating conditions or may even fail to function. Therefore above analysis is performed for various operating conditions to make sure that the circuit performs as specified under these conditions. Such operating conditions for a circuit are modeled using corners that comprise a set of libraries characterized for process, voltage, and temperature variations.

The analysis of a circuit is also repeated for different operating modes including, normal operating mode, test mode, scan mode, reset mode, and so on. For example, an electronic circuit used in a computer operates in a stand-by mode when the computer is in a stand-by mode. Similarly, during testing phase, a circuit may be operated in a test mode. A mode is modeled using a unique set of clocks, input voltages, and timing constraints in similar operating conditions.

For performing analysis during implementation and sign-off of a circuit, designers have to verify a large number of modes and corners. Each circuit design may have several modes and several corners. Typically each mode is verified for each corner conditions. A combination of a mode for a given corner is referred to as a scenario. The total number of scenarios for which the design needs to be verified is the product of the number of modes and number of corners. Since the number of scenarios for which a circuit design needs to be analyzed can be very high, the physical memory required for accommodating the design in memory and the run time for performing analysis can become impractical. Therefore, electronic circuit design tools attempt to reduce the number of scenarios they analyze in order to perform the analysis using reasonable amount of resources.

Conventional methods for reducing the large number of scenarios either do not provide significant improvements in the memory or run time requirements or do so at the cost of reducing the quality of results. For example, a system may ignore a large number of scenarios during analysis. In this situation, the final analysis may not satisfy requirements imposed by the scenarios that were ignored. This may be realized very late during the design or fabrication process and significant portions of the design process may have to be repeated. This results in significant delays and costs of the design and manufacture process.

SUMMARY

The above and other issues are addressed by a computer-implemented method, computer system, and computer program product for reducing number of scenarios analyzed for an electronic circuit. A plurality of scenarios for a mode of an electronic circuit is received. Each scenario corresponds to a corner of the electronic circuit. A winner scenario is selected from the plurality of scenarios based on violations of scenarios from the plurality of scenarios. For example, the winner scenario may be a dominant scenario that has the most number of violations compared to other scenarios. Since the winner scenario may not cover all the violations of the remaining scenarios, violations covered by other scenarios that are not covered by the winner scenario are identified. The winner scenario is modified to introduce the identified violations in the modified scenario. The modification of the winner scenario is performed by adjusting the required times of timing nodes corresponding to the violations identified in other scenarios. As a result, the modified winner scenario covers the violations of other scenarios. The modified winner scenario is used for further analysis.

In an embodiment, multiple scenarios are received, each scenario associated with a mode and a corner. The scenarios received are grouped such that each group corresponds to corners for a mode. The scenarios from each group are processed by following the above process resulting in a modified scenario for each group.

In an embodiment, adjusting the required times of timing nodes of the winner scenario to cover a violation in another scenario comprises reducing the required times of timing nodes based on timing values associated with the timing node in the other scenario. The required time for the timing node is reduced by a margin determined based on the difference between the slack of the timing node in the winner scenario and the slack of the timing node from the other scenario scaled by a factor. In an embodiment, the scaling factor corresponds to the ratio of arrival time for a particular timing node in the winner scenario and the arrival time for the same timing node in the other scenario The features and advantages described in this summary and the following detailed description are not all-inclusive. Many additional features and advantages will be apparent to one of ordinary skill in the art in view of the drawings, specification, and claims hereof.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

DETAILED DESCRIPTION

An electronic circuit can be represented as a circuit configuration comprising a description of the components of the circuit and the connections between the circuits specified as netlists and a representation of the timing constraints for the circuit. Each mode of a given circuit can be modeled as a set of timing constraints for the given set of netlists for a given electronic circuit to be analyzed. A corner may correspond to a combination of parameters describing operation of the electronic circuit, for example, process, voltage, and temperature at which the electronic circuit is operated. These parameters affect the timing delays of various paths in the electronic circuit.

Electronic circuits are analyzed to determine whether there are timing violations at various timing nodes corresponding to the parameters of a particular corner. A timing node may also be referred to as a timing endpoint. The delay caused by each component of the electronic circuit for a given set of parameters may be obtained by invoking a library. These delays caused by various components are used to determine overall delays across various paths of the electronic circuit. For example, a hold time violation is caused when an input signal for a component changes too quickly after the clocks transition. Similarly, a setup time violation may be caused when the signal arrives too late at the input for a component with respect to the clock signal. Other types of violations analyzed include max-transition and leakage violations. The analysis of the electronic circuit determines timing delays associated with various timing nodes of the electronic circuit including the arrival time, required time, and slack for various timing nodes of the electronic circuit. The slack at a timing node corresponds to the difference between the required time and the arrival time at the timing node. The slack value can be computed for various timing nodes of the circuit for a scenario to determine whether there are any violations. For example, if the arrival time is greater than the required time for a timing node, the signal at the timing node arrives later than the required time. Accordingly, the slack value at the timing node is negative and corresponds to a timing violation (a timing violation is also referred to herein as a "violation").

A scenario may have multiple violations. For example, for a given mode, various corners may be analyzed each covering a different set of violations. A corner C1 is determined as covering another corner C2 if all violations in C2 also occur in C1. Accordingly, a particular corner covers multiple other corners if all violations occurring in the other corners occur in that particular corner. If a corner includes violations that are not covered by any other corners, that corner must be analyzed in order to track these violations. However, if all violations of corner C2 are covered by corner C1, the analysis process can skip analysis of corner C2 so long as the corresponding violations are analyzed as part of analysis of corner C1.

Embodiments of the invention receive multiple scenarios corresponding to the same mode for analysis. The system determines a dominant scenario from the received set of scenarios. The dominant corner may correspond to a corner that covers the largest set of violations. However, other embodiments may select the dominant corner based on other criteria. Violations from other corners that do not occur in the dominant corner are identified. The dominant scenario is modified so as to cover these identified violations from the other scenarios. The modification of a scenario to cover a violation corresponding to a timing node corresponds to adjusting the required time at that timing node so as to cover the violations, for example, by reducing the required time. Once the dominant scenario is modified to cover all violations corresponding to the various scenarios for the mode, the remaining scenarios can be skipped and analysis performed only for the dominant scenario. As a result, the number of scenarios analyzed is reduced without ignoring any violations that occur in the scenarios that are skipped.

The techniques described herein reduce the complexity of various types of analysis performed using the compressed scenarios, for example, optimizations performed during electronic design automation including post-route optimizations. Compression of the scenarios allows optimization of the compressed scenarios without degrading performance for other scenarios that were not specifically analyzed. Other types of analysis that benefit from compression of scenarios include determination of timing critical paths in the compressed scenarios.

Overview of EDA Design Flow

Figure 1:
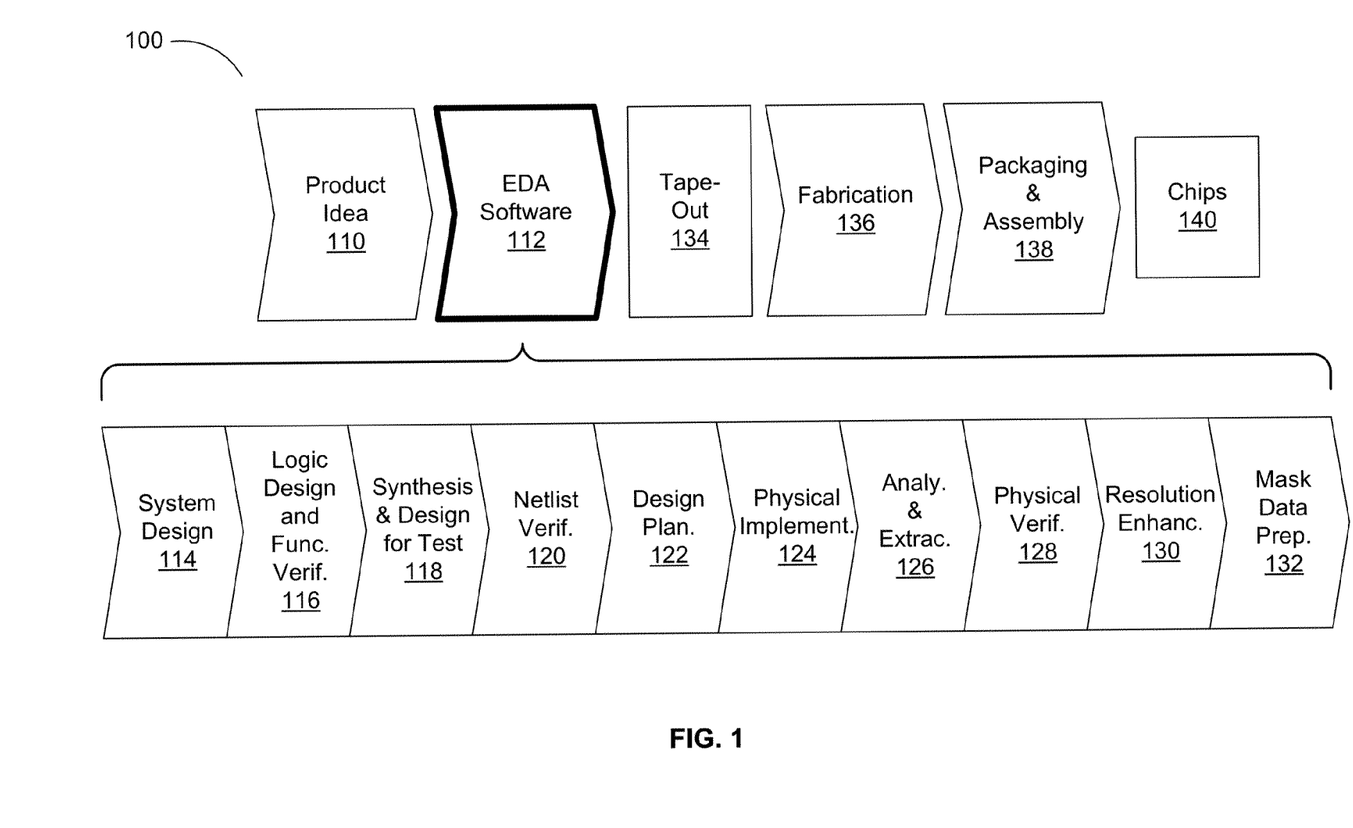
FIG. 1 is a flowchart 100 illustrating the various operations in the design and fabrication of an integrated circuit.

FIG. 1 is a flowchart 100 illustrating the various operations in the design and fabrication of an integrated circuit. This process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

The EDA software 112 may be implemented in one or more computing devices such as the computer 100 of FIG. 1. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 112 that includes operations between design planning 122 and physical implementation 124. One type of analysis performed by the EDA software 112 corresponds to timing analysis of an electronic circuit, for example, static timing analysis that analyses timing of an electronic circuit without performing a detailed simulation of the circuit.

Scenario Compression

Figure 2:
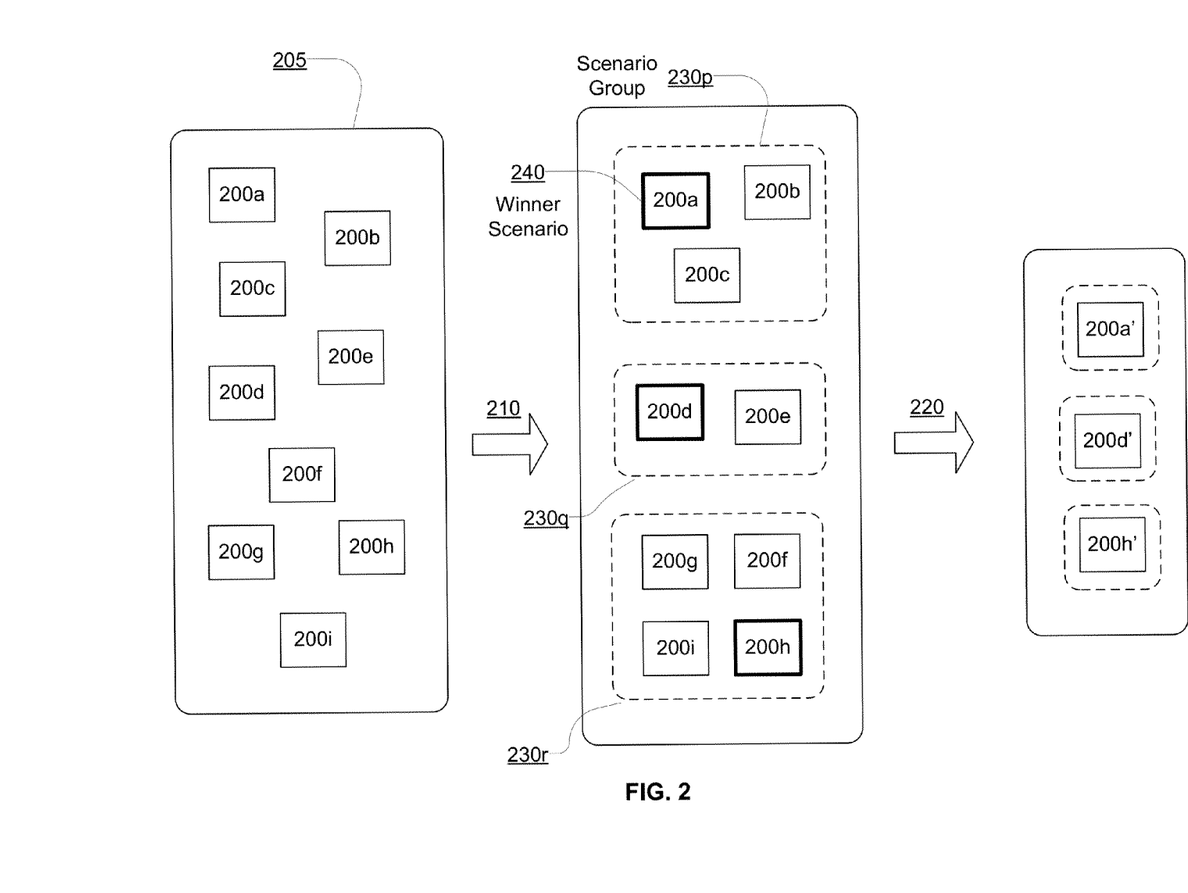
FIG. 2 illustrates the overall process of scenario compression, in accordance with an embodiment.

FIG. 2 illustrates the overall process of scenario compression, in accordance with an embodiment. FIG. 1 and the other figures use like reference numerals to identify like elements.

A letter after a reference numeral, such as "230a," indicates that the text refers specifically to the element having that particular reference numeral. A reference numeral in the text without a following letter, such as "230," refers to any or all of the elements in the figures bearing that reference numeral (e.g. "230" in the text refers to reference numerals "230a" and/or "230b" in the figures).

As disclosed in FIG. 2, information describing various scenarios 200, each scenario corresponding to a mode and a corner is received for analysis. The overall set of scenarios received for analysis is illustrated as set 205 in FIG. 2. The scenarios from the set 205 are grouped 210 into different groups 230. For example, FIG. 2 illustrates three groups 230p, 230q, and 230r being determined 210 from the set 205 of scenarios. The different scenarios of a group 230 correspond to different corners for the same mode. Accordingly, each group 230 is associated with one mode. Therefore the constraints of different scenarios of a group 230 are matching. For example, if a particular constraint is present in a scenario of the group 230, there is a corresponding constraint in each remaining scenario of the group.

A winner scenario 240 is selected from each group 230 of scenarios. For example, as illustrated in FIG. 2, the winner scenario from group 230p is 200a, the winner scenario from group 230q is 200d, and winner scenario from group 230r is 200h. The winner scenario 240 is a scenario that has the likelihood of detecting the most violations when further analysis is performed. However, there may be certain violations that are likely to be detected by scenarios other than the dominant scenarios. The constraints of the winner scenario from each group are adjusted 220 to account for the violations of other scenarios from the group. For example, the slack for a timing node for the winner scenario may be reduced to match the slack of another scenario.

In other word, there is no violation that can occur in any other scenario of the group that cannot occur in the modified winner scenario. As a result, there is no need to analyze the remaining scenarios of each group. The further analysis is performed only for the modified winner scenarios and the remaining scenarios are skipped. Although the remaining scenarios are skipped, all possible violations of the skipped scenarios are accounted for by the modified winner scenario.

System Architecture

Figure 3:
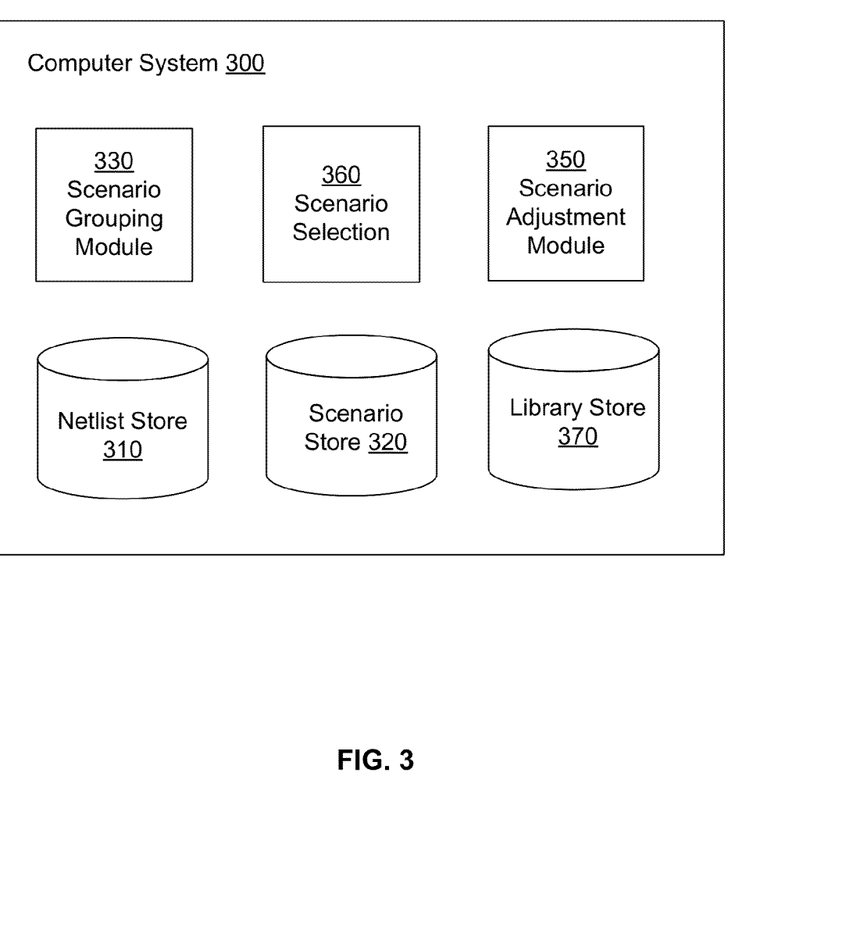
FIG. 3 illustrates the system architecture for compression of scenarios of an electronic circuit, in accordance with an embodiment.

FIG. 3 illustrates an embodiment of the system architecture for automatic verification and generation of merged modes based on individual modes. The computer architecture illustrated in FIG. 3 comprises a computer system 300 comprising a scenario grouping module 330, a scenario selection module 360, a scenario modification module 350, a netlist store 310, a scenario store 320, and a corner library store 370. In one embodiment, the computer system 300 can be a conventional computer system executing, for example, a Microsoft Windows-compatible operating system (OS), Apple OS X, and/or a Linux distribution. Some embodiments of the computer system 300 have different and/or other modules than the ones described herein, and the functions can be distributed among the modules in a different manner than described here. For example, the computer system 300 might also include modules for receiving electronic circuit information via a network or modules for transmitting results via the network.

The netlist store 310 stores the information describing the netlists for the electronic circuits. The information stored in the netlist includes various components of the circuit, various timing nodes and their interconnections. The scenario store 320 stores information describing various scenarios comprising the modes and corner combination for each scenario. The library stores 370 stores modules that determine timing information for different types of circuit components for different parameters including process, voltage, and temperature. For example, for a given corner, the timing information for a given component of the circuit can be determined by invoking the appropriate module for the components from the library store 370.

The scenario grouping module 330 determines groups of the input scenarios for an electronic circuit such that each group corresponds to a mode. All scenarios corresponding to a mode have matching timing graphs. In an embodiment, the scenario grouping module 330 matches timing graphs corresponding to the various input scenarios to determine groups of scenarios. Matching graphs to determine whether they are equivalent can be a time consuming process. However, the scenario grouping module 330 matches timing graphs based on heuristic techniques. In an embodiment, the scenario grouping module 330 determines a hash value based on the structure of the graphs. For example, the various nodes and edges of each graph may be arranged in a predetermined order to determine an ordered list. The ordered list is used to determine a hash value. The various hash values of the graphs can be compared to identify groups of graphs that are equivalent. In other embodiments, various aspects of two graphs may be compared to make a heuristic determination whether the graphs are matching.

Two distinct modes of the circuit are highly likely to have different timing graphs. As a result, the hash values corresponding to two scenarios corresponding to two distinct modes result in distinct hash values. On the other hand, all scenarios corresponding to a particular mode have matching timing graphs. Therefore, all scenarios corresponding to the same mode result in the same hash value. The comparison of hash values allows the scenario grouping module 330 to identify all scenarios corresponding to a mode which are included in the corresponding group.

The scenario selection module 360 selects a winner scenario from each scenario group determined by the scenario grouping module 330. In an embodiment, the winner scenario is a dominant scenario from the group. In an embodiment, the winner scenario is the dominant scenario from the group. A dominant scenario is a scenario that has the most number of violations, for example, a scenario that has the worst slack for the constraints. However, it is possible that the winner scenario has worst slack among all scenarios for some of the constraints but other scenarios have worst slacks for other constraints. For example, in group 230, the winner scenario 240 corresponding to scenario 200a may have the worst slack for 10 constraints but scenario 200b may have worst slack for two other constraints and scenario 200c may have worst slack for 3 other constraints. Typical circuits may have much larger number of constraint and the numbers of constraints in the examples are for illustrative purposes only.

The scenario adjustment module 350 adjusts 220 the constraints of the winner scenario from each group to account for account for violations from other scenarios of the group. The following processing is performed for each group of scenarios corresponding to a mode. Timing nodes for which the worst slack corresponds to a scenario other than the winner scenario are identified. The constraints are modified so that the slack of the winner scenario for these timing nodes matches or is worse than the remaining scenarios. As a result, the modified winner scenarios 200a', 200d', and 200h' have the worst slack for every timing nodes. Since the modified winner scenario has the worst slack for each timing node, the modified winner scenario captures all possible violations.

Figure 4:
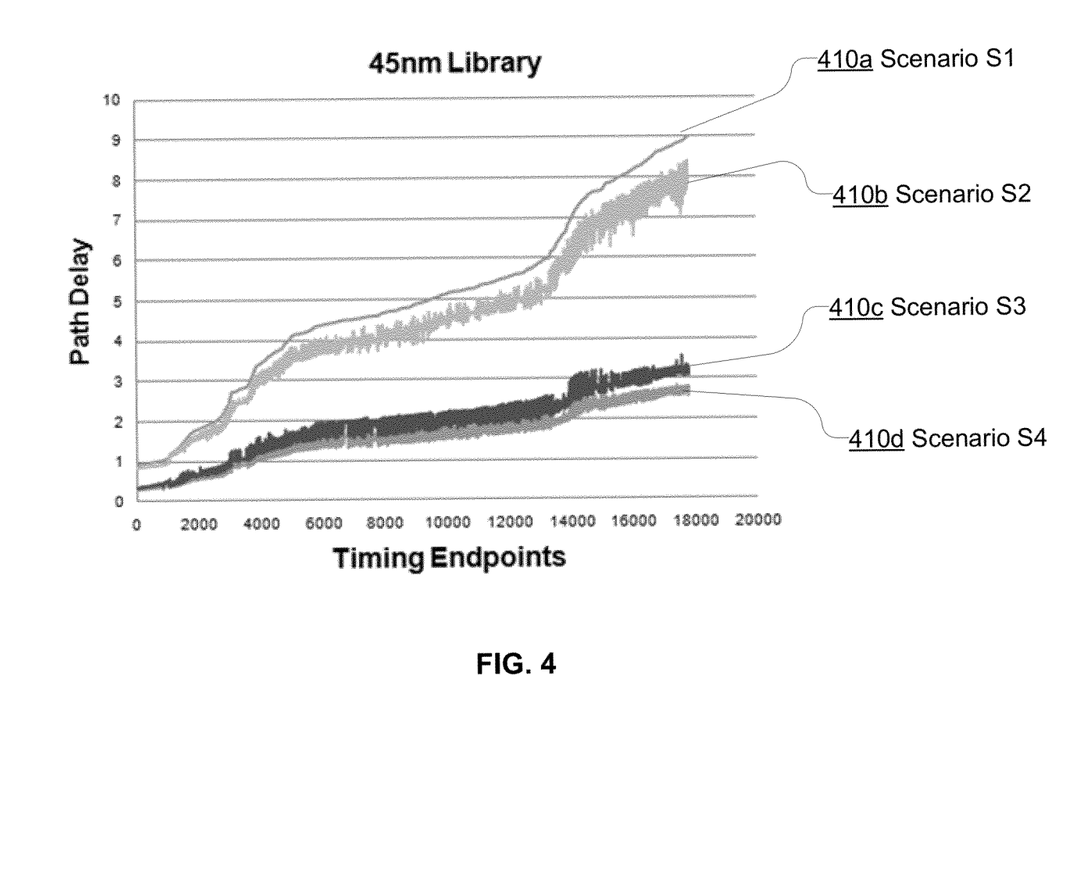
FIG. 4 shows a graph illustrating the relationship between timing of different scenarios having the same set of constraints, in accordance with an embodiment.

FIG. 4 shows a graph illustrating the relationship between timing of different scenarios having the same set of constraints, in accordance with an embodiment. The timings of two scenarios of a mode are experimentally determined to have a linear relationship with each other. FIG. 4 shows a graph with timing endpoints (or timing nodes) along the x-axis and path delays (or timing delays) for each timing node along the y-axis for a 45 nm library. FIG. 4 shows four graphs 410a, 410b, 410c, and 410d corresponding to four scenarios S1, S2, S3, and S4 respectively. The timing nodes along the x-axis are sorted in order of increasing timing delays values but can be arranged in any other order. As shown by the graph in FIG. 4 the timing delays for any one scenario are correlated with the timing delays of the other scenarios. In other words, the arrival time, required time, and slack for one scenario can be expressed as a linear function of the corresponding arrival time, required time, and slack for another scenario for the same mode.

Following are equations for modifying the timing delay values associated with a timing node for a scenario, expressed in terms of timing delay values for another scenario. In particular, the timing values are determined so as to adjust a scenario S1 to cover violations of another scenario S2 for the same mode. The scenario S1 after adjustment is referred to the modified scenario C (or the compressed scenario). Equation (1) defines $C_{slack}$, the slack of a timing node for the modified scenario C in terms of $S2_{slack}$, the corresponding slack for the same timing node for scenario S2. The slack for the timing node for the modified scenario is obtained by multiplying the slack for the other scenario by a scaling factor $\alpha$.

$$C_{slack} = \alpha \times S2_{slack} \qquad (1)$$

In equation (1), the value of the scaling factor $\alpha$ is determined by equation (2) in terms of the arrival time $S1_{arr}$ for the timing node in scenario S1 and $S2_{arr}$ for the timing node in scenario S2. As shown in equation (2), the value of scaling factor $\alpha$ is determined by taking the ratio of the arrival time for the node in scenario S1 and the arrival time for the node in scenario S2. The scaling factor $\alpha$ can also be determined based on arrival times of other timing nodes.

$$\alpha = \frac{S1_{arr}}{S2_{arr}} \qquad (2)$$

In an embodiment, the scaling factor $\alpha$ is determined as a single value for a pair of corners. In these embodiments the value of the scaling factor $\alpha$ determined for the pair of corners is used for each pair of corresponding timing nodes from the two corners. The value $C_{req}$ representing the required time for the timing node for the modified scenario C is obtained by using the equation (3) below where $S1_{req}$ represents the required time for the timing node for scenario S1, $S1_{slack}$ represents the slack for the timing node for scenario S1, and $C_{slack}$ represents the slack for the timing node in the modified scenario as obtained from equation (1). As shown in equation (3), the value of the required time $C_{req}$ for the timing node for the modified scenario is obtained by reducing the value of the required time from the original scenario by a margin. The value of the margin is obtained by taking the difference of the value of slack $S1_{slack}$ for the timing node in the original scenario and the slack $C_{slack}$ determined for the modified scenario based on equation (1).

$$C_{req} = S1_{req} - (S1_{slack} - C_{slack}) \qquad (3)$$

In an embodiment, the value of value of $C_{req}$ is determined using equation (4) that subtracts an additional term $\delta$ from the value obtained by equation (3). The additional term reduces the likelihood of an optimization based on the compressed scenario from making a bad move that could cause a violation.

$$C_{req} = S1_{req} - (S1_{slack} - C_{slack})\delta \quad (4)$$

In equation (4), the value of $\delta$ is obtained as a fraction of the arrival time of the timing node $S1_{arr}$ as described in equation (5).

$$\delta = \beta \times S1_{arr} \quad (5)$$

In equation (5) the value $\delta$ is a constant having a value less than 1, for example, a constant having value in the range $0 \le \beta \le 0.1$.

In other embodiments, the values of $C_{req}$ and $C_{slack}$ can be obtained by using variation of above equations, for example, by multiplying certain terms from the above equations by constant factors.

Overall Process of Scenario Compression

Figure 5:
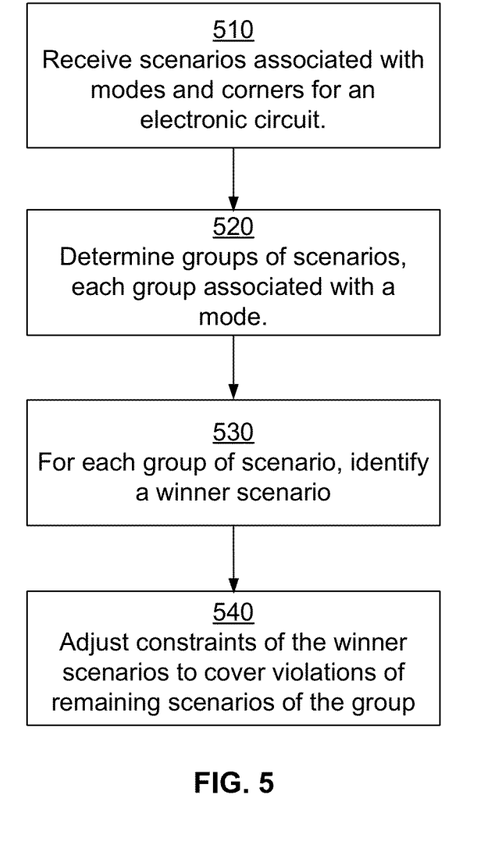
FIG. 5 is a flowchart illustrating the process for compressing scenarios of an electronic circuit, in accordance with an embodiment.

FIG. 5 is a flowchart illustrating the process for compressing scenarios of an electronic circuit, in accordance with an embodiment. The scenario grouping module 330 receives a set 205 of scenarios that need to be analyzed. These scenarios may be stored in the scenario store 320 and read by the scenario grouping module 330. The scenario grouping module determines 520 groups 230 of scenarios such that each group corresponds corners for to a particular mode. The groups of scenarios may be determined based on matching of timing graphs corresponding to the various scenarios. The selection module selects 530 a winner scenario 240 from each group 230 of scenarios. The winner scenario may correspond to the dominant scenario of the group that covers the most number of violations. The scenario adjustment module 350 modifies the constraints of the winner scenario for each group 230 such that the modified winner scenario covers any violations belonging to the remaining scenarios of the group that were not covered by the original winner scenario.

Figure 6:
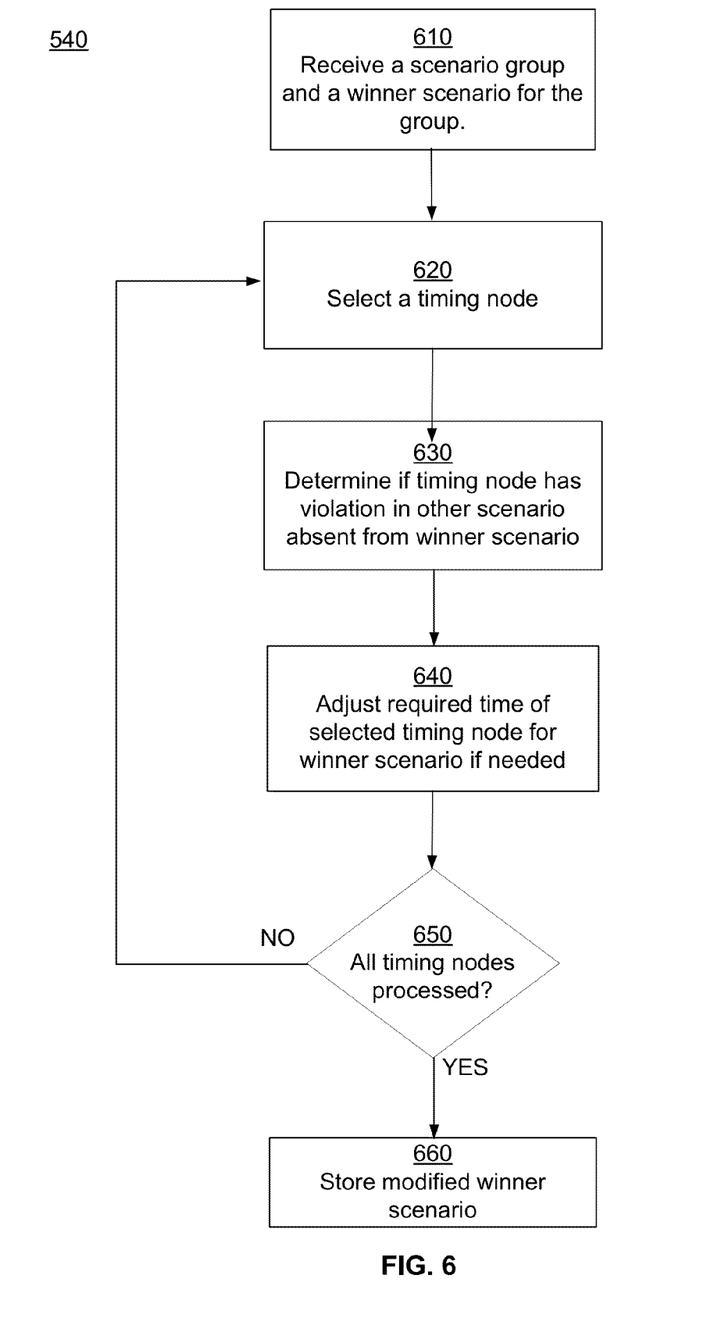
FIG. 6 is a flowchart illustrating the process for adjusting the constraints of the scenarios based on other scenarios of the group, in accordance with an embodiment.
Figure 7:
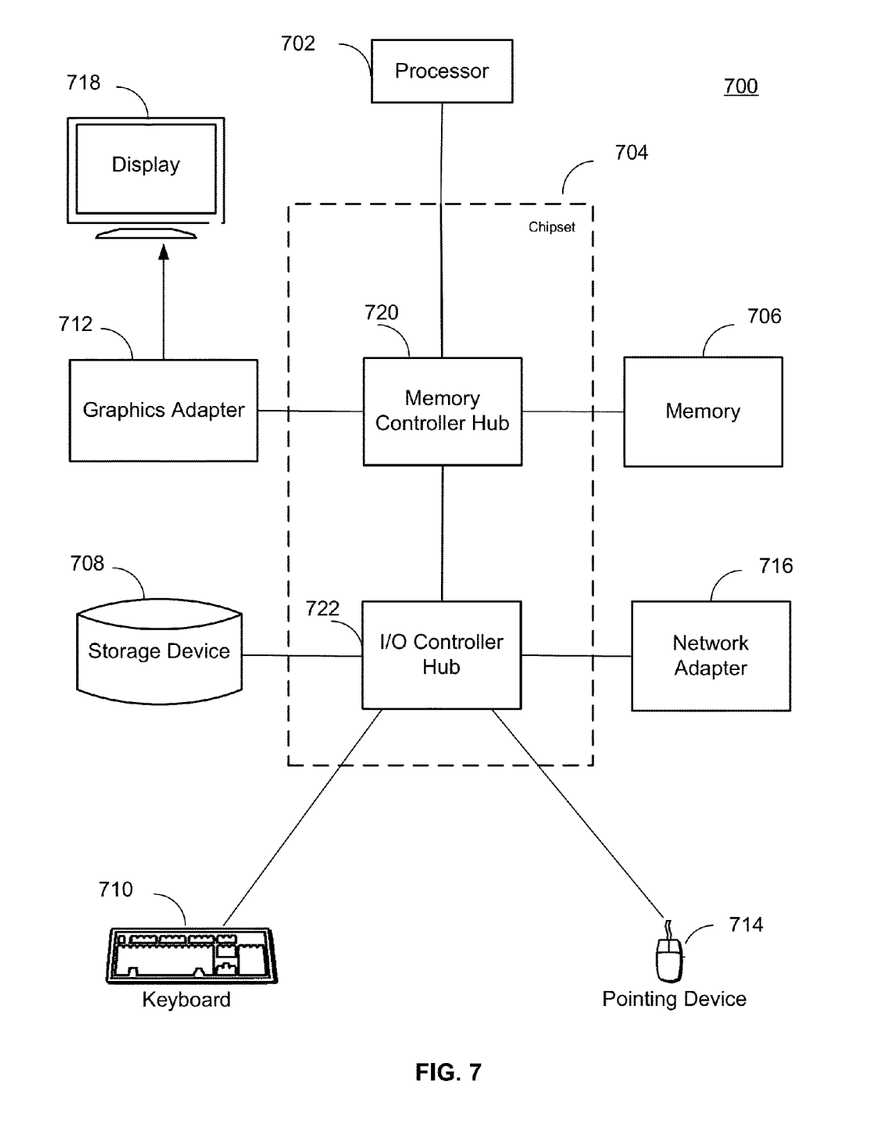
FIG. 7 is a high-level block diagram illustrating an example of a computer for use in compression of scenarios, in accordance with an embodiment.

FIG. 7 is a flowchart illustrating the process for adjusting 540 the constraints of the scenarios based on other scenarios of the group, in accordance with an embodiment. The process described in FIG. 7 is applied to each group of scenarios as determined in the process illustrated in FIG. 6. The scenario adjustment module 350 receives 510 a scenario group and a winner scenario for the group. The scenario adjustment module 350 determines all violations that are covered by other scenarios but not covered by the winner scenario and modifies the timing delay values of the winner scenario to make sure that the modified scenario covers these violations.

In the embodiment, disclosed in FIG. 7, the scenario adjustment module 350 iterates over all timing nodes to determine if the timing delay values for the timing nodes need to be adjusted for the winner scenario. The scenario adjustment module 350 selects 620 a timing node and determines 630 if the selected timing node has violations in other scenarios of the scenario group that are either absent from the winner scenario or are less severe in the winner scenario. The scenario adjustment module 350 determines 630 if the selected timing node has violations in other scenarios of the scenario group that are present in both the winner scenario and the other scenario but are less significant in the winner scenario but more significant in the other scenario. As a result, the violation in the other scenario may not be ignored during the analysis compared to the winner scenario. If the timing node is associated with a violation in another scenario of the group such that the violation is either absent from the winner scenario or less significant in the winner scenario, the scenario adjustment module 350 adjusts 640 the timing delay values of the timing node for the winner scenario. The adjustment of the timing delay values for the timing nodes are performed in accordance with the equations (1)-(5) described herein. For example, the required time for the timing node is reduced so that the modified winner scenario covers this violation.

In other embodiments, the scenario adjustment module 350 may keep information describing the violations for each scenario and iterate over the various violations to determine whether the constraints associated with timing delays for the winner scenario need to be adjusted to make sure the winner scenario covers that violation.

Although the compression of scenarios is described with respect to setup and hold violations, other types of violations can be considered by the scenario compression techniques described herein, for example, max-transition and leakage violations. To analyze leakage, a subset of scenarios is defined as leakage scenarios, i.e., only leakage parameters are analyzed for these scenarios. In an embodiment, all the data required to compute leakage for a scenario is stored in memory so that the values can be determined as needed. In embodiment, max-transition scaling can be performed similar to the setup/hold analysis described herein to adjust the library max-transition constraint.

Computer Architecture

FIG. 7 is a high-level block diagram illustrating an example computer 700 that can be used for processing the steps of the processes described herein. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702. The types of computers 700 used can vary depending upon the embodiment and requirements. For example, a computer may lack displays, keyboards, and/or other devices shown in FIG. 7.

Computer Architecture

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for comparing timing constraints of circuits. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for reducing number of scenarios analyzed for an electronic circuit, the method comprising:
    receiving a plurality of scenarios for an electronic circuit, each scenario corresponding to a mode and a corner;
    grouping the scenarios into one or more groups of scenarios, each scenario from a group of scenarios corresponding to a particular mode;
    for each group of scenarios:
        selecting a winner scenario based on violations of scenarios of the group;
        identifying violations that are not covered by the winner scenario but are covered by at least one other scenario; and
        modifying, by a computer, the winner scenario by adjusting required times of timing nodes in the winner scenario so as to introduce violations in the winner scenario corresponding to the identified violations, wherein adjusting a required time of a timing node of the winner scenario comprises reducing the required time of the timing node by a margin, wherein the margin by which the required time of the timing node is reduced comprises a difference between a slack of the timing node in the winner scenario and a slack of the timing node from the other scenario scaled by a factor; and
    storing the modified winner scenarios for each group.

2. The computer-implemented method of claim 1, wherein the scaling factor corresponds to a ratio of an arrival time for a particular timing node in the winner scenario and an arrival time for the particular timing node in the other scenario.

3. The computer-implemented method of claim 1, wherein the margin by which the required time for the timing node is reduced further comprises an additional term determined as a fraction of an arrival time for the timing node.

4. The computer-implemented method of claim 1, wherein selecting the winner scenario comprises selecting a scenario having a maximum number of violations in the group.

5. The computer-implemented method of claim 1, wherein selecting the winner scenario comprises selecting a scenario having more violations than at least one other scenario of the group.

6. The computer-implemented method of claim 1, wherein the modified winner scenario covers all violations for other scenarios of the group.

7. The computer-implemented method of claim 1, wherein grouping the scenarios into one or more groups of scenarios comprises matching a hash value determined from the timing graphs corresponding to the scenarios.

8. A computer-implemented method for reducing number of scenarios analyzed for an electronic circuit, the method comprising:
    receiving a plurality of scenarios for a mode of an electronic circuit, each scenario corresponding a corner;
    selecting a winner scenario from the plurality of scenarios based on violations of each of the plurality of scenarios;
    identifying at least one violation for a timing node, the violation not covered by the winner scenario but covered by another scenario from the plurality of scenarios;
    modifying, by a computer, the winner scenario by adjusting a required time of the timing node in the winner scenario so as to introduce a violation in the modified winner scenario corresponding to the identified violation of the other scenario, wherein adjusting the required time of a timing node of the winner scenario comprises reducing the required time of the timing node by a margin, wherein the margin by which the required time for the timing node is reduced comprises a difference between a slack of the timing node in the winner scenario and a slack of the timing node in the other scenario scaled by a factor; and
    storing the modified winner scenario.

9. The computer-implemented method of claim 8, wherein the scaling factor corresponds to a ratio of an arrival time of a particular timing node in the winner scenario and an arrival time of a corresponding timing node in the other scenario.

10. The computer-implemented method of claim 8, wherein the margin by which the required time for the timing node is reduced further comprises an additional term determined as a fraction of an arrival time of the timing node.

11. The computer-implemented method of claim 8, wherein selecting the winner scenario comprises selecting a scenario having a maximum number of violations in the plurality of scenarios.

12. The computer-implemented method of claim 8, wherein selecting the winner scenario comprises selecting a scenario having more violations than at least one other scenario of the plurality of scenarios.

13. A computer-implemented method for reducing number of scenarios analyzed for an electronic circuit, the method comprising:
   receiving a plurality of scenarios for a mode of an electronic circuit, each scenario corresponding to a corner;
   selecting a winner scenario from the plurality scenarios, the winner scenario having more violations than at least one other scenarios from the plurality of scenarios;
   identifying violations covered by other scenarios from the plurality of scenarios and not covered by the winner scenario, each identified violation for a timing node;
   modifying, by a computer, the winner scenario by adjusting required times of timing nodes of the winner scenario associated with the identified violations, the adjusting comprising, for each identified violation from another scenario:
      determining a compressed slack value by scaling the slack of the timing node in the other scenario by a scaling factor representing timing values of the winner scenario compared to timing values of the other scenario;
      determining a margin value comprising a difference between the slack of the timing node in the winner scenario and the compressed slack value; and
      reducing the required time of the timing node by the margin value; and
   storing the modified winner scenario.

14. The computer-implemented method of claim 13, wherein the scaling factor corresponds to a ratio of an arrival time for a particular timing node in the winner scenario and an arrival time for the particular timing node in the other scenario.

15. The computer-implemented method of claim 13, wherein the margin by which the required time for the timing node is reduced further comprises an additional term determined as a fraction of an arrival time for the timing node.

16. A computer-implemented system for reducing number of scenarios analyzed for an electronic circuit, the system comprising:
   a computer processor; and
   a computer-readable storage medium storing computer program modules configured to execute on the computer processor, the computer program modules comprising:
      a scenario selection module configured to:
         receive a plurality of scenarios for a mode of an electronic circuit, each scenario corresponding to a corner;
         select a winner scenario from the plurality scenarios based on violations of scenarios from the plurality of scenarios;
      a scenario adjustment module configured to:
         identify at least one violation for a timing node, the violation covered by another scenario from the plurality of scenarios and not covered by the winner scenario;
         modify the winner scenario by adjusting required times of timing nodes of the winner scenario so as to introduce violations in the modified winner scenario corresponding to the identified violations in the other scenarios, wherein adjusting the required time of a timing node of the winner scenario for a violation of the timing node from another scenario comprises reducing the required time of the timing node by a margin, wherein the margin by which the required time of the timing node is reduced comprises a difference between a slack of the timing node in the winner scenario and a slack of the timing node from the other scenario scaled by a factor, the scaling factor corresponding to a ratio of arrival time for the timing node in the winner scenario and arrival time for the timing node in the other scenario; and
         storing the modified winner scenario.

17. The computer-implemented system of claim 16, further comprising:
   a scenario grouping module configured to determine the plurality of scenarios, the scenario grouping module configured to:
      receive scenarios for an electronic circuit, each scenario corresponding to a mode and a corner; and
      grouping the scenarios into one or more groups of scenarios, such that each scenario from a group of scenarios corresponds to a particular mode and one of the group corresponds to the plurality of scenarios.

18. A non-transitory computer readable storage medium storing a computer program product including computer instructions configured to cause a processor of a computer to perform a computer-implemented method for reducing number of scenarios analyzed for an electronic circuit, the computer program product comprising:
   a scenario selection module configured to:
      receive a plurality of scenarios for a mode of an electronic circuit, each scenario corresponding to a corner;
      select a winner scenario from the plurality scenarios based on violations of scenarios from the plurality of scenarios;
   a scenario adjustment module configured to:
      identify at least one violation for a timing node, the violation covered by another scenario from the plurality of scenarios and not covered by the winner scenario;
      modify the winner scenario by adjusting required times of timing nodes of the winner scenario so as to introduce violations in the modified winner scenario corresponding to the identified violations in the other scenarios, wherein adjusting the required time of a timing node of the winner scenario for a violation of the timing node from another scenario comprises reducing the required time of the timing node by a margin, wherein the margin by which the required time of the timing node is reduced comprises a difference between a slack of the timing node in the winner scenario and a slack of the timing node from the other scenario scaled by a factor, the scaling factor corresponding to a ratio of arrival time for the timing node in the winner scenario and arrival time for the timing node in the other scenario; and
      storing the modified winner scenario.

19. The computer readable storage medium of claim 18, further comprising:

a scenario grouping module configured to determine the
plurality of scenarios, the scenario grouping module
configured to:
receive scenarios for an electronic circuit, each scenario
corresponding to a mode and a corner; and
group the scenarios into one or more groups of scenarios, such that each scenario from a group of scenarios corresponds to a particular mode and one of the
group corresponds to the plurality of scenarios.

* * * * *